(12) United States Patent
Yoon et al.

(10) Patent No.: US 9,167,150 B2
(45) Date of Patent: Oct. 20, 2015

(54) APPARATUS AND METHOD FOR PROCESSING IMAGE IN MOBILE TERMINAL HAVING CAMERA

(71) Applicant: Samsung Electronics Co., Ltd, Gyeonggi-do (KR)

(72) Inventors: Youngkwon Yoon, Seoul (KR); Jaesik Sohn, Gyeonggi-do (KR); Pyojae Kim, Seoul (KR); Jinhee Na, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 14/162,615

(22) Filed: Jan. 23, 2014

(65) Prior Publication Data

US 2014/0204236 A1 Jul. 24, 2014

(30) Foreign Application Priority Data

Jan. 23, 2013 (KR) ........................ 10-2013-0007252

(51) Int. Cl.
 *G03B 13/00* (2006.01)
 *H04N 5/232* (2006.01)
 *H04N 5/235* (2006.01)
 *G02B 27/00* (2006.01)
 *G02B 7/38* (2006.01)

(52) U.S. Cl.
 CPC ........ *H04N 5/23212* (2013.01); *G02B 27/0075* (2013.01); *H04N 5/2356* (2013.01); *H04N 5/23232* (2013.01); *G02B 7/38* (2013.01)

(58) Field of Classification Search
 CPC .......... H04N 5/23212; H04N 5/23232; H04N 5/2356; G02B 7/38; G06T 2207/20221
 USPC ......... 348/222.1, 345, 207.1, 207.11, 207.99, 348/208.1, 208.5; 382/255
 See application file for complete search history.

(56) References Cited

U.S. PATENT DOCUMENTS

| | | | |
|---|---|---|---|
| 8,675,085 B2 * | 3/2014 | Beckers et al. | 348/218.1 |
| 2003/0151679 A1 * | 8/2003 | Amerson et al. | 348/231.6 |
| 2006/0061678 A1 * | 3/2006 | Yamazaki | 348/349 |
| 2008/0259176 A1 * | 10/2008 | Tamaru | 348/222.1 |
| 2009/0169122 A1 * | 7/2009 | He et al. | 382/238 |
| 2011/0135208 A1 | 6/2011 | Atanassov et al. | |
| 2012/0169849 A1 * | 7/2012 | Ferren | 348/46 |

OTHER PUBLICATIONS

Extended European Search Report in connection with EP Application No. 14152081.7, Apr. 15, 2014, 6 pages.

* cited by examiner

*Primary Examiner* — Lin Ye
*Assistant Examiner* — Chriss Yoder, III

(57) ABSTRACT

An apparatus and method process an image in a portable terminal having a camera. The apparatus obtains a final image from a plurality of images by performing a focusing function based on a plurality of images photographed by varying focus characteristics of an identical subject.

18 Claims, 9 Drawing Sheets

APPARATUS AND METHOD FOR PROCESSING IMAGE IN MOBILE TERMINAL HAVING CAMERA

CROSS-REFERENCE TO RELATED APPLICATION(S) AND CLAIM OF PRIORITY

The present application is related to and claims the benefit under 35 U.S.C. §119(a) of a Korean patent application filed on Jan. 23, 2013 in the Korean Intellectual Property Office and assigned Serial No. 10-2013-0007252, the entire disclosure of which is hereby incorporated by reference.

TECHNICAL FIELD

The present disclosure relates to an apparatus and method for processing an image in a portable terminal having a camera and, more particularly, to an apparatus and method for obtaining a final image from a plurality of images by performing a focusing function based on a plurality of images photographed by varying focus characteristics of an identical subject.

BACKGROUND

In a conventional camera, a depth of lens must be changed by exchanging a lens or changing the number of apertures, in order to utilize an all-focus or out-focus function. However, a structure of lens exchange or an aperture integrated lens has a large size, and thereby has problems in applying to a camera of mobile phone or compact camera according to the trend of miniaturization.

Further, the out-focusing function may be utilized by dividing an image obtained by a camera having a high depth of focus into a portion to be focused and background by using a segmentation technology and applying a blur filter to the background. However, there are problems in obtaining a high quality photo because an error may be generated in dividing a subject and background, and deterioration of image quality may be generated when applying the blur filter due to the limitation of segmentation technology. The all-focus function may be utilized by using an EDoF (Extended Depth of Focus) technology which expands the depth of effect through image processing. However, this method is seldom used due to the deterioration of image quality. Further a re-focusing function may be utilized by using a camera obtaining information of light path, such as a plenoptic camera and array camera. However, this method has problems in obtaining a high resolution photo.

Accordingly, developments in technology providing focusing functions such as an all-focus, out-focus, and re-focus function are necessary for the camera of mobile phone and compact camera according to the trend of miniaturization.

SUMMARY

To address the above-discussed deficiencies, it is a primary object to provide an apparatus and method for obtaining a final image from a plurality of images by performing a focusing function based on a plurality of images photographed by varying focus characteristics of an identical subject.

An apparatus for processing an image in a portable terminal having a camera according to the present disclosure includes a display unit; and a control unit obtaining a third image from a plurality of first images by performing a focusing function based on the plurality of images photographed by varying focus characteristics of an identical subject, and displaying the obtained third image through the display unit.

Further, a method for processing an image in a portable terminal having a camera according to the present disclosure includes obtaining a third image from a plurality of first images by performing a focusing function based on the plurality of first images photographed by varying focus characteristics of an identical subject; and displaying the obtained third image.

According to the present disclosure, focusing functions such as an all-focus, out-focus, and re-focus function can be utilized in image capturing by obtaining a plurality of images having different focus characteristics based on the plurality of images captured by varying the focus characteristics and performing a focusing function based on the obtained plurality of images.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. Hereinafter, embodiments of the disclosure are described in detail with reference to the accompanying drawings. The same reference symbols are used throughout the drawings to refer to the same or like parts. Detailed descriptions of well-known functions and structures incorporated herein may be omitted to avoid obscuring the subject matter of the disclosure.

Figure 1:
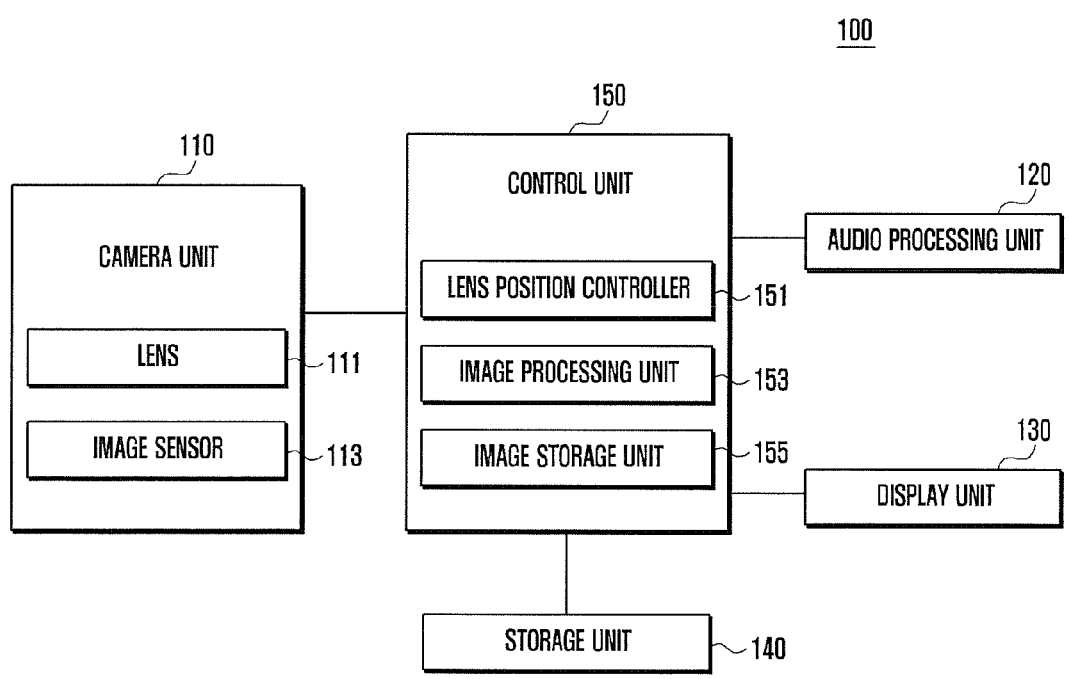
FIG. 1 illustrates a block diagram of an internal structure of portable terminal according to an embodiment of the present disclosure.

FIG. 1 illustrates a block diagram of an internal structure of portable terminal 100 according to an embodiment of the present disclosure.

Referring to FIG. 1, the portable terminal 100 according to the present disclosure may include a camera unit 110, audio processing unit 120, display unit 130, storage unit 140, and control unit 150.

The camera unit 110 performs a function of receiving a video signal. The camera unit 110 is configured with a lens 111 and image sensor 113, and processes frame images such as a still image and moving image obtained by the image sensor 113 in a communication mode or photographing mode. The frame image processed by the camera unit 110 may be output through the display unit 130. Further, the frame image processed by the camera unit 110 may be stored in the storage unit 140 or transmitted to the outside through a wireless communication unit (not shown).

The camera unit 110 may be configured with more than one camera according to the specification of the portable terminal 100. For example, the portable terminal 100 may have two cameras respectively disposed at the same side of the display unit 130 and at the opposite side of the display unit 130.

The audio processing unit 120 may be configured with a codec, and the codec may be configured with a data codec processing packet data and audio codec processing an audio signal such as a voice. The audio processing unit 120 converts a digital audio signal to an analog audio signal through the audio codec and plays through a speaker (SPK), and converts an analog audio signal input by a microphone (MIC) to a digital audio signal through the audio codec.

The display unit 130 visually provide a user with diversified information such as a menu, input data, and function settings of the portable terminal 100. The display unit 130 performs a function of outputting a booting screen, waiting screen, menu screen, communication screen, and application screen of the portable terminal 100.

The display unit 130 may be configured with an LCD (Liquid Crystal Display), OLED (Organic Light Emitting Diode), AMOLED (Active Matrix Organic Light Emitting Diode), flexible display, or 3 Dimensional display.

The storage unit 140 performs a role of storing programs and data required for the operation of the portable terminal 100, and may be divided into a program area and data area. The program area may store a program to control the general operation of the portable terminal 100, OS (Operating System) booting the portable terminal 100, application program required for playing multimedia contents, and other optional functions of the portable terminal 100 such as a voice conversation function, camera function, sound play function, and play function of still image or moving image. The data area is an area storing data generated by using the portable terminal 100, and may store a still image, moving image, phone book, and audio data.

The control unit 150 controls the general operation of each component of the portable terminal 100. If an image photographing function provided by the portable terminal 100 is executed, the control unit 150 enters the image photographing mode by controlling the camera unit 110. Further, the control unit 150 may photograph an image according to a user's operation and store the photographed image in the storage unit 140.

In particular, the control unit 150 according to the present disclosure obtains a plurality of first images having different focus characteristics while capturing the plurality of first images by varying the focus characteristics of an identical subject. Namely, when capturing an image through the camera unit 110, the control unit 150 photographs the image by varying the distance between the image sensor 113 and lens 111 for a plurality of times, and obtains the plurality of first images having different focus characteristics. Further, the control unit 150 may obtain a third image from the plurality of first images by performing a focusing function based on the plurality of first images. For this, the control unit 150 according to the present disclosure may be configured with a lens position controller 151, image processing unit 153, and image storage unit 155.

Hereinafter, an image processing operation according to an embodiment of the present disclosure is described referring to FIGS. 2 to 4.

Figure 2:
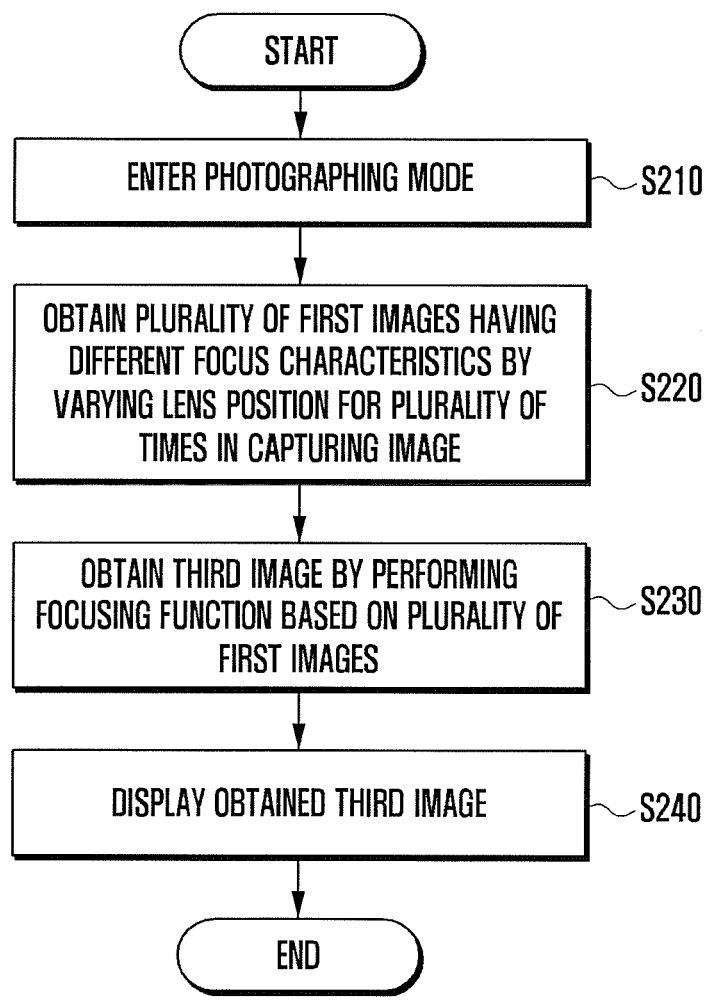
FIG. 2 illustrates a flowchart of a procedure of processing an image according to an embodiment of the present disclosure.
Figure 3:
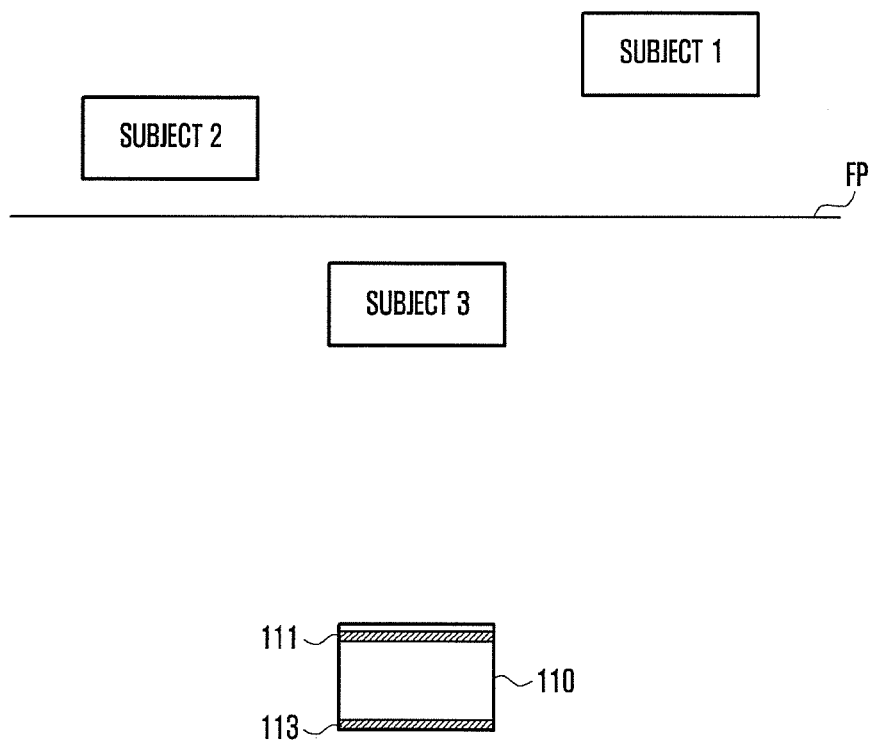
FIG. 3 illustrates an example of photographing scene according to an embodiment of the present disclosure.
Figure 4:
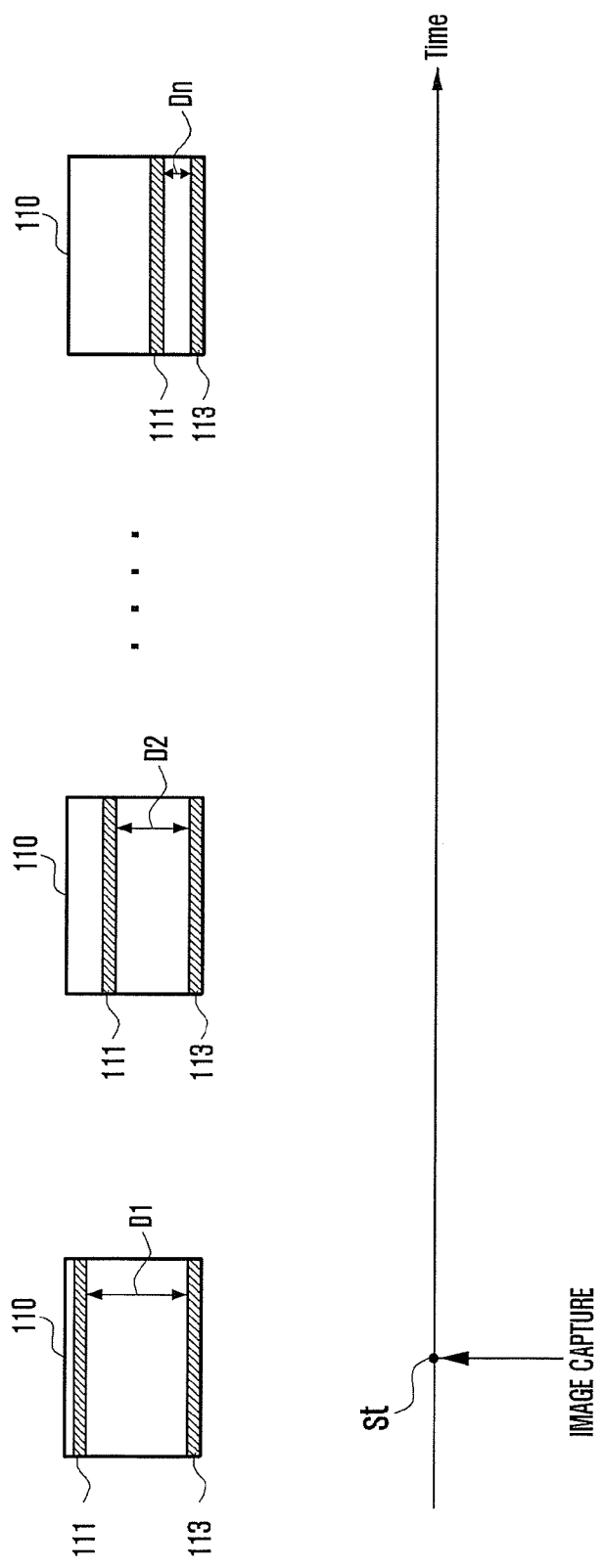
FIG. 4 illustrates variable movement of lens position according to an embodiment of the present disclosure.

FIG. 2 illustrates a flowchart of a procedure of processing an image according to an embodiment of the present disclosure, FIG. 3 illustrates an example of photographing scene according to an embodiment of the present disclosure, and FIG. 4 illustrates variable movement of lens position according to an embodiment of the present disclosure.

In FIG. 2, if the portable terminal enters an image photographing mode (S210), the lens position controller 151 varies the position of lens 111 installed in the camera unit 110 to obtain a plurality of first images having different focus characteristics while capturing an image according to a user's operation (S220). Namely, the lens position controller 151 may obtain a plurality of first images by photographing while adjusting the distance between the lens 111 and image sensor 113 to change the position of the lens 111 for a plurality of times.

Referring to FIG. 3, when capturing an image in the order of distances (subject 3, subject 2, and subject 1) based on the camera unit 110, the position controller 151 may obtain images by changing the position of lens 111 through the camera unit 110 to adjust a focal plane (FP). Namely, as the distance between the lens 111 and image sensor 113 becomes greater, the focal plane (FP) approaches the camera unit 110. In the mean time, the extent of image blurring increases as the subject is located apart from the focal plane (FP). Referring to FIG. 4, if capturing an image is started (st) according to a user's operation, the lens position controller 151 may obtain a plurality of images having different focus characteristics by adjusting the distance (D1, D2, . . . , Dn) between the lens 111 and image sensor 113.

Returning to FIG. 2, the image processing unit 153 obtains a third image from a plurality of first images by performing a focusing function based on the captured plurality of first images while varying the position of lens 111 through the lens position controller 151 (S230).

In more detail, the image processing unit 153 may obtain a third image from a plurality of first image by comparing the plurality of first images each other and synthesizing focused images among the plurality of first images by subjects configuring the first image. Namely, for the plurality of first images, the image processing unit 153 may perform an all-focus function by obtaining images focused on each subject in an image including a plurality of subjects and synthesizing the images focused on each subject.

Further, the image processing unit 153 may obtain a third image by analyzing the plurality of first images and comparing each other, synthesizing first images selected from the plurality of first images by the user into a focused image, and synthesizing the remainder of the plurality of first images into an unfocused image. Namely, the image processing unit 153 may perform an out-focus function and re-focus function by synthesizing subject selected from a plurality of subject by the user into a focused image and the remainder of the plurality of subjects into an unfocused image. The third image includes portions focused on the different subjects generated from at least a portion of the one or more images Here, the image processing unit 153 may obtain the third image from the plurality of first image after applying a blur filter to the remainder of the plurality of first images. Namely, the image processing unit 153 may increase the blurring extent of the remainder to make the image portion selected by the user sharper.

Further, when applying the blur filter, the image processing unit 153 may apply different blur filters to each of the remainder images. Namely, the image processing unit 153 does not apply the same blur filter to the remainder images but applies different blur filters to each of the remainder images.

Subsequently, the image processing unit 153 may display the obtained third image through the display unit 130 (S240). Here, the image storage unit 155 may store the plurality of first images in the storage unit 140 by combining into a file format. For example, a plurality of images captured by varying focus characteristics for an identical subject may be included in the image file stored in the storage unit 140. The image processing unit 153 may perform a re-focus function by combining a plurality of first images having different focus characteristics and storing them in a file format. Namely, the image processing unit 153 may perform the re-focus function by using a plurality of images included in one image file stored in the storage unit 140, and by performing an out-focus function only for the images selected by the user.

Hereinafter, a method of processing an image according to another embodiment of the present disclosure is described referring to FIG. 5.

Figure 5:
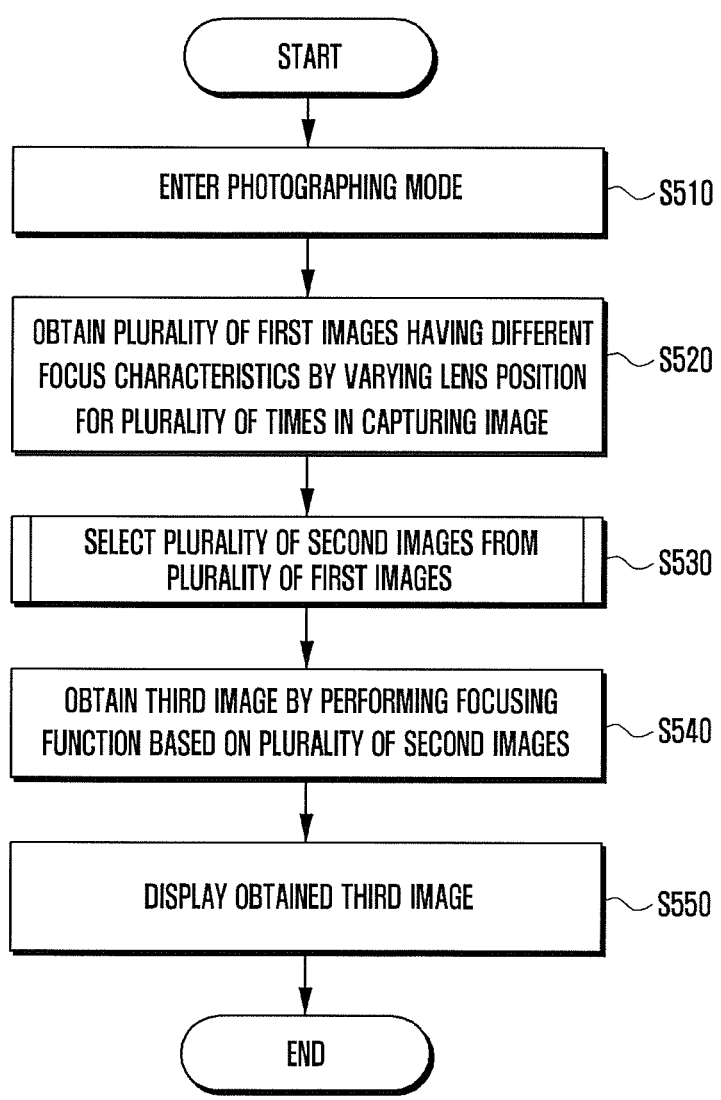
FIG. 5 illustrates a flowchart of a procedure of processing an image according to another embodiment of the present disclosure.

FIG. 5 illustrates a flow chart illustrating a procedure of processing an image according to another embodiment of the present disclosure.

The procedure of processing an image according to the embodiment is practically similar to that of the previous embodiment, and thereby only the portions having differences are described hereafter.

Referring to FIG. 5, if the portable terminal 100 enters an image photographing mode (S510), the lens position controller 151 obtains a plurality of first images having different focus characteristics by varying the position of lens 111 installed in the camera unit 110 when capturing the images according to a user's operation (S520).

Subsequently, the image processing unit 153 selects a plurality of second images from the plurality of first images while varying the position of lens 111 through the lens position controller 151 (S530).

The image processing unit 153 then obtains a third image from the plurality of second images by performing a focusing function based on the plurality of second images selected from the first images (S540). Namely, the image processing unit 153 may perform an all-focus, out-focus, or re-focus function based on the plurality of second image.

Subsequently, the image processing unit 153 may display the obtained third image through the display unit 130 (S550).

Here, the image storage unit 155 may store the plurality of second images in the storage unit 140 by combining into a file format.

Hereinafter, a procedure of selecting a plurality of second images according to another embodiment of the present disclosure is described in more detail referring to FIGS. 6 to 9.

Figure 6:
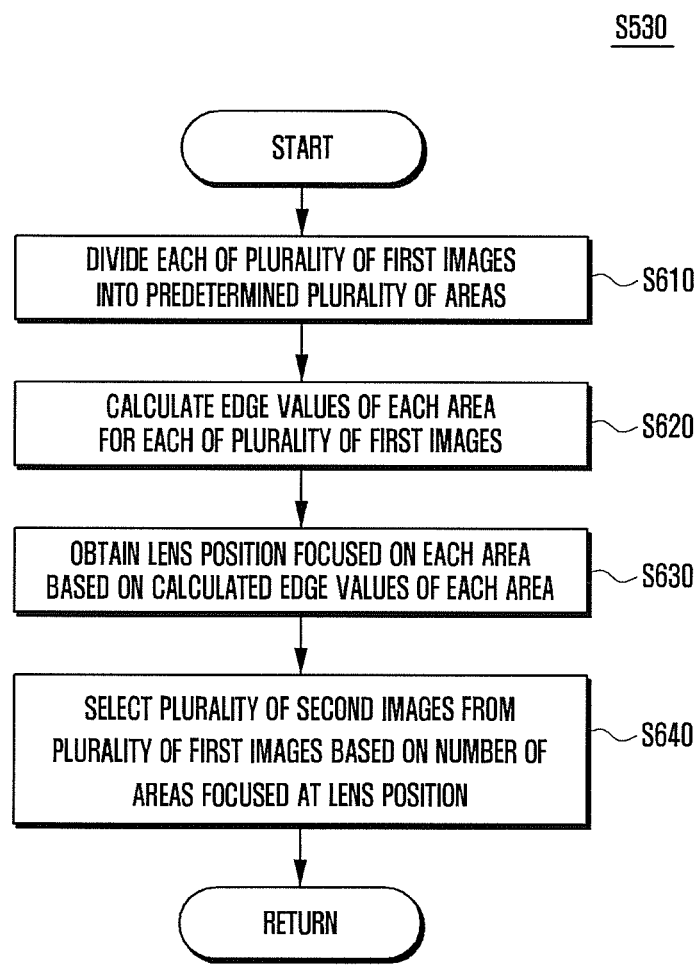
FIG. 6 illustrates a flow chart of a detailed procedure of selecting a plurality of second images of FIG. 5.

FIG. 6 illustrates a flow chart of a detailed procedure of selecting a plurality of second images of FIG. 5, and FIGS. 7 to 9 illustrate examples of selecting a plurality of second images according to another embodiment of the present disclosure. The procedure illustrated in FIG. 6 is an example of one embodiment of step S530 in FIG. 5.

Figure 7:
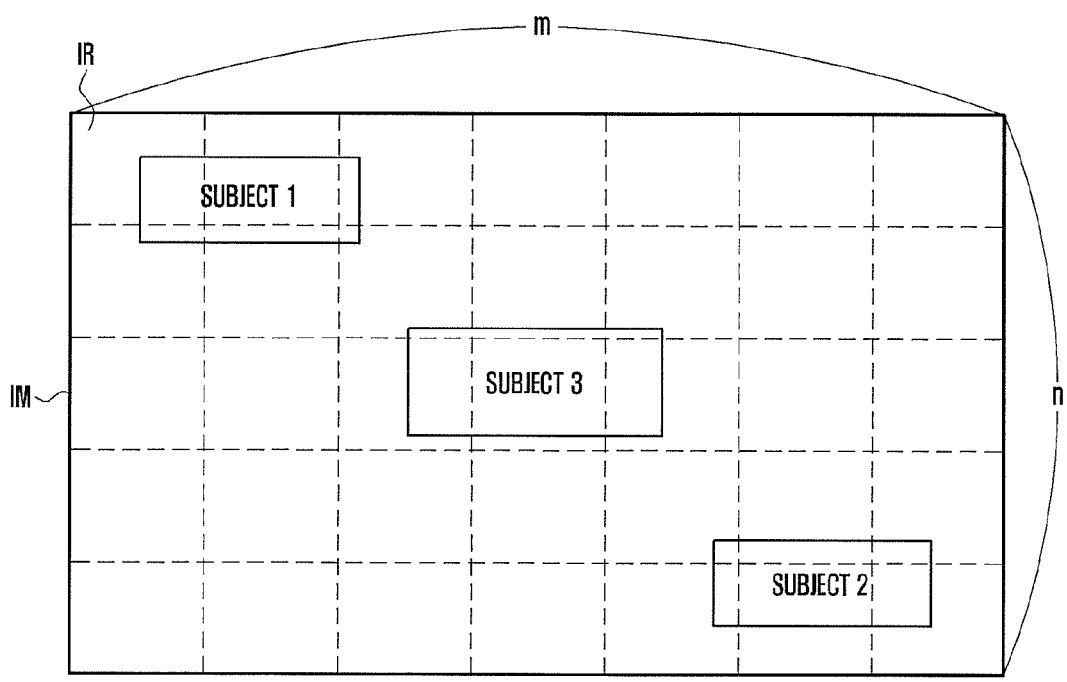
FIGS. 7 to 9 illustrate examples of selecting a plurality of second images according to another embodiment of the present disclosure.

Referring to FIG. 6, the image processing unit 153 divides each of the plurality of first images into a predetermined plurality of areas (S610). As shown in FIG. 7, the image processing unit 153 may divide a first image (IM) into the number 'm×n' of areas (IR) according to a predetermined size.

Figure 8:
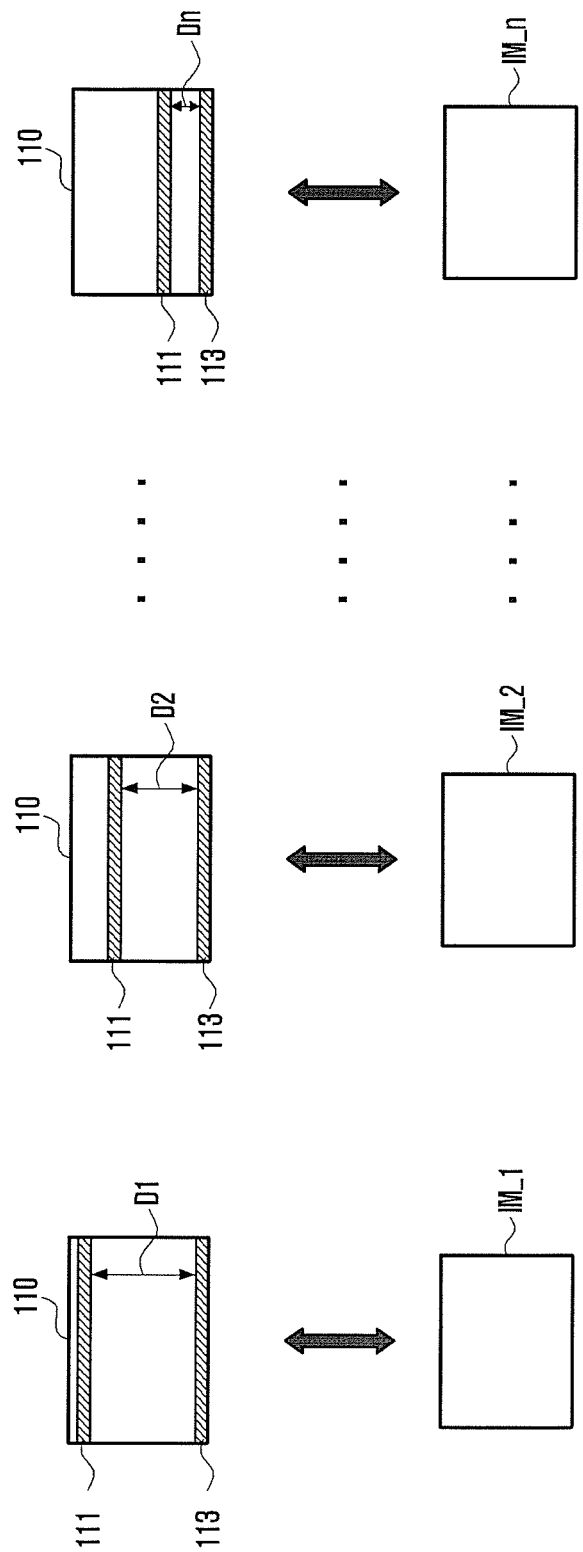

Subsequently, the image processing unit 153 calculates an edge value of each area for the divided plurality of first image (S620). The edge value means the average sharpness of each area. For example, the larger the edge value, the greater the sharpness of the area is. As shown in FIG. 8, the image processing unit 153 calculates an edge value of each area (IR) for the divided plurality of first images (IM_1, IM_2, ..., IM_n). For example, the image processing unit 153 calculates a differential value from the difference between a pixel and an adjacent pixel configuring each area (IR), and calculates the edge value of each area (IR) based on the calculate differential value.

The image processing unit 153 then obtains a position of lens 111 focusing on each area based on the calculated edge value of each area (S630). For example, the image processing unit 153 compares an edge value of area (IR) with a plurality of edge values calculated for the plurality of first images (IM_1, IM_2, ..., IM_n), and may obtain a position of lens 111 corresponding to an image having the highest edge value from the plurality of first images (IM_1, IM_2, ..., IM_n). The image processing unit 153 may obtain positions of lens 111 focusing on each area by performing this process repeatedly for each area (IR). Namely, the image processing unit 153 may obtain the distances between the lens 111 and image sensor 113 for each area (IR).

Figure 9:
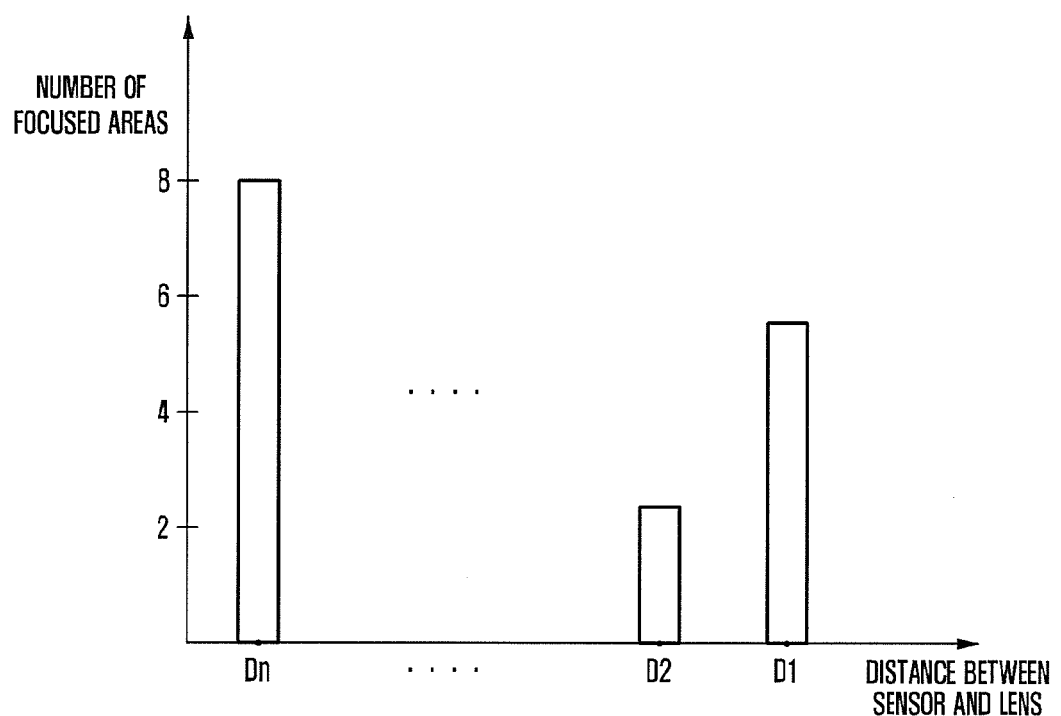

Subsequently, the image processing unit 153 selects a plurality of second images from the plurality of first images based on the number of areas individually focused by the lens 111 (S640). In more detail, the image processing unit 153 may obtain the number of focused areas corresponding to each position of the lens 111 from distance information between the lens 111 and image sensor 113 obtained for each area (IR). For example, the image processing unit 153 may obtain a histogram as shown in FIG. 9. If the distance between the lens 111 and image sensor 113 is 'Dn', a captured image (IM_n) has about 8 focused areas. If the distance is 'D2', a captured image (IM_2) has about 2 focused areas. If the distance is 'D1', a captured image (IM_1) has about 6 focused areas.

The image processing unit 153 may select a plurality of second images from the plurality of first images based on the number of focused areas corresponding to each position of the lens 111. Here, the image processing unit 153 may decide the number of second images to be selected from the plurality of first images by using information such as the total number of divided areas (IR), the number of subject included in an image, and the number of focused areas. For example, if the number of subject included in the image is 3, the image processing unit 153 may select 4 second images from the plurality of first images. Further, the image processing unit 153 may select an image having a great variation in the number of focused areas as a second image. Of course, the number of second images to be selected from the plurality of first images may be predetermined.

The image processing unit 153 may select a plurality of second images from the plurality of first images based on the number of focused areas corresponding to each position of the lens 111 and a predetermined importance factor. Here, the importance factor includes a distance from the center of image, type of subject, and extent of color change. Generally, a user takes a photo in a state of locating a main subject in the center of image, and thereby an area located closer to the center of image has a higher value in the importance factor and an area located further from the center of image has a lower value in the importance factor. By using this characteristics, the image processing unit 153 may compensate the number of focused areas corresponding to each position of the lens 111. The image processing unit 153 may select a plurality of second images from the plurality of first images based on the compensated number of focused areas corresponding to each position of the lens 111.

As described above, when capturing an image, focusing functions such as an all-focus, out-focus, and re-focus function may be utilized in the portable terminal 100 by obtaining a plurality of images having different focus characteristics and performing the focusing function based on the obtained plurality of images.

The present disclosure described that the control unit 150, lens position controller 151, image processing unit 153, and image storage unit 155 are configured in separate blocks and each block performs a different function. However, this is only for the convenience in descriptions, and each function may not be divided as described above. For example, a specific function performed by the lens position controller 151 and image processing unit 153 may be performed by the control unit 150.

Further, when capturing an image, a method of obtaining a third image by obtaining a plurality of first images having different focus characteristics and performing a focusing function based on the plurality of obtained images has been described, however the present disclosure is not limited to this. According to another embodiment, the plurality of first images obtained in capturing images may be stored as an image file by combining them, and if a stored image file is selected according to a user's operation, a focusing function may be performed based on the plurality of first images included in the image file and according to the user's operation.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus to process an image in a portable terminal, the apparatus comprising:
    a camera unit including one or more lenses;
    a display unit; and
    a control unit configured to:
        perform a focusing function based on a plurality of first images that were photographed with varying focus characteristics of an identical subject,
        divide each of the plurality of first images into a predetermined plurality of areas,
        calculate an edge value for each area of the predetermined plurality of areas of the first images,
        obtain a lens position focusing on each of the areas of the predetermined plurality of areas of the first images based on the calculated edge value of each of the areas,
        select a plurality of second images from the plurality of first images based on a number of areas focused by the one or more lenses for each of the lens positions and based on a predetermined factor of importance,
        obtain a third image based on the plurality of second images, and
        cause the display unit to display the obtained third image, wherein the predetermined factor of importance comprises at least one of a distance from a center of an image, a type of subject, and an extent of a color change.

2. The apparatus of claim 1, wherein the camera unit further includes an image sensor, and wherein the control unit is configured to obtain the plurality of first images having different focus characteristics by varying a distance between the image sensor and the one or more lenses while generating an image using the camera unit.

3. The apparatus of claim 1, wherein the edge value comprises an average sharpness of each of the areas.

4. The apparatus of claim 1, further comprising:
    a storage unit, and wherein the control unit is configured to store the plurality of first images or the plurality of second images in the storage unit by combining the first or second images in a file format.

5. The apparatus of claim 1, wherein the control unit is configured to compare the plurality of first images with each other and synthesize focused images selected from the plurality of first images by a subject present in the first images.

6. The apparatus of claim 1, wherein the control unit is configured to compare the plurality of first images with each other, synthesize a portion of the plurality of first images selected by a user as a focused image, and synthesize a remainder of the plurality of first images as an unfocused image.

7. The apparatus of claim 6, wherein the control unit is configured to apply a blur filter to the remainder of the first images.

8. The apparatus of claim 7, wherein the control unit is configured to apply different blur filters to each image corresponding to the remainder of the plurality of first images when applying the blur filter.

9. The apparatus of claim 1, wherein the plurality of first images include one or more images focused on different subjects, and wherein the third image includes portions focused on the different subjects generated from at least a portion of the one or more images.

10. A method to process an image in a portable terminal comprising a camera, the method comprising:
    performing a focusing function based on a plurality of first images that were photographed with varying focus characteristics of an identical subject;
    dividing each of the plurality of first images into a predetermined plurality of areas;
    calculating an edge value of each area for the plurality of first images;
    obtaining a position of one or more lenses focusing on each area based on the calculated edge value of each area;
    selecting a plurality of second images form the plurality of first images based on a number of areas focused by the one or more lenses for each position and based on a predetermined factor of importance;
    obtaining a third image based on the selected plurality of second images; and displaying the obtained third image, wherein the factor of importance comprises at least one of a distance from a center of an image, a type of subject, and an extent of a color change.

11. The method of claim 10, further comprising:
obtaining the plurality of first images having different focus characteristics by varying a distance between an image sensor and the one or more lenses for a plurality of times while generating an image using the camera.

12. The method of claim 10, wherein edge value comprises the average sharpness of each of the areas.

13. The method of claim 10, further comprising:
storing the plurality of first images or the plurality of second images in a storage unit by combining the first or second images in a file format.

14. The method of claim 10, further comprising comparing the plurality of first images with each other and synthesizing focused images selected from the plurality of first images by subject present in the first images.

15. The method of claim 10, further comprising comparing the plurality of first images with each other, synthesizing a portion of the plurality of first images selected by a user as a focused image, and synthesizing a remainder of the plurality of first images as an unfocused image.

16. The method of claim 15, further comprising applying a blur filter to the remainder of the first images.

17. The method of claim 16, wherein obtaining the third image comprises applying different blur filters to each image corresponding to the remainder of the plurality of first images when applying the blur filter.

18. The method of claim 10, wherein the plurality of first images include one or more images focused on different subjects, and wherein the third image includes portions focused on the different subjects generated from at least a portion of the one or more images.

* * * * *